(12) United States Patent
Loffink

(10) Patent No.: US 10,486,527 B2
(45) Date of Patent: Nov. 26, 2019

(54) MULTI-USE FUEL TANK FLANGE ASSEMBLY

(71) Applicant: John A. Loffink, Damascus, OR (US)

(72) Inventor: John A. Loffink, Damascus, OR (US)

( * ) Notice: Subject to any disclaimer, the term of this patent is extended or adjusted under 35 U.S.C. 154(b) by 0 days.

(21) Appl. No.: 15/276,801

(22) Filed: Sep. 27, 2016

(65) Prior Publication Data
US 2017/0015468 A1    Jan. 19, 2017

Related U.S. Application Data

(63) Continuation-in-part of application No. 14/059,042, filed on Oct. 21, 2013, now Pat. No. 9,914,558.

(60) Provisional application No. 61/718,006, filed on Oct. 24, 2012.

(51) Int. Cl.
*B60K 15/03* (2006.01)
*B60K 15/01* (2006.01)

(52) U.S. Cl.
CPC .............. *B60K 15/03* (2013.01); *B60K 15/01* (2013.01); *B60K 2015/0346* (2013.01); *B60K 2015/0348* (2013.01); *B60K 2015/03453* (2013.01)

(58) Field of Classification Search
CPC ........ B65D 25/10; B65D 25/20; B60K 15/01; B60K 15/03; B60K 2015/03118; B60K 2015/03125; B60K 2015/03453; B60K 2015/0477; B60K 15/04; F16L 37/107
USPC .............. 220/304, 378, 601, 293, 319, 4.14; 277/630, 637, 644; 292/256.6, 307 R
See application file for complete search history.

(56) References Cited

U.S. PATENT DOCUMENTS

| | | | |
|---|---|---|---|
| 5,514,312 A * | 5/1996 | Hardy | C08L 43/04 264/101 |
| 6,415,941 B1 * | 7/2002 | Huse | B29C 41/04 220/4.13 |
| 6,533,288 B1 * | 3/2003 | Brandner | B60K 15/03 220/304 |
| 2002/0063129 A1 * | 5/2002 | Potter | B29C 65/565 220/4.13 |
| 2003/0107218 A1 * | 6/2003 | Anderson | B60K 15/04 285/360 |
| 2012/0187131 A1 * | 7/2012 | Claucherty | B60K 15/03 220/562 |
| 2012/0306111 A1 * | 12/2012 | Klose | B29C 48/903 264/40.3 |

* cited by examiner

*Primary Examiner* — Andrew T Kirsch
*Assistant Examiner* — Elizabeth J Volz
(74) *Attorney, Agent, or Firm* — Ingrid McTaggart

(57) ABSTRACT

A multi-use fuel tank flange assembly facilitates the attachment and removal of multiple components thereto, such as a draw and return tube assembly, a fuel filler neck, and a cover plate. Each of these components may be removed from the flange without damage to the component, the flange or the fuel tank. Multiple flanges may be used on a single fuel tank to allow multiple components to be secured to the single fuel tank.

16 Claims, 9 Drawing Sheets

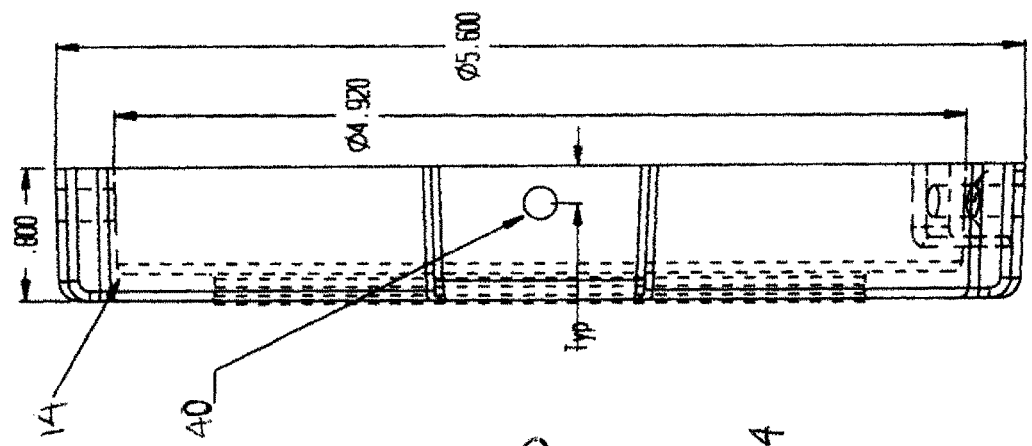
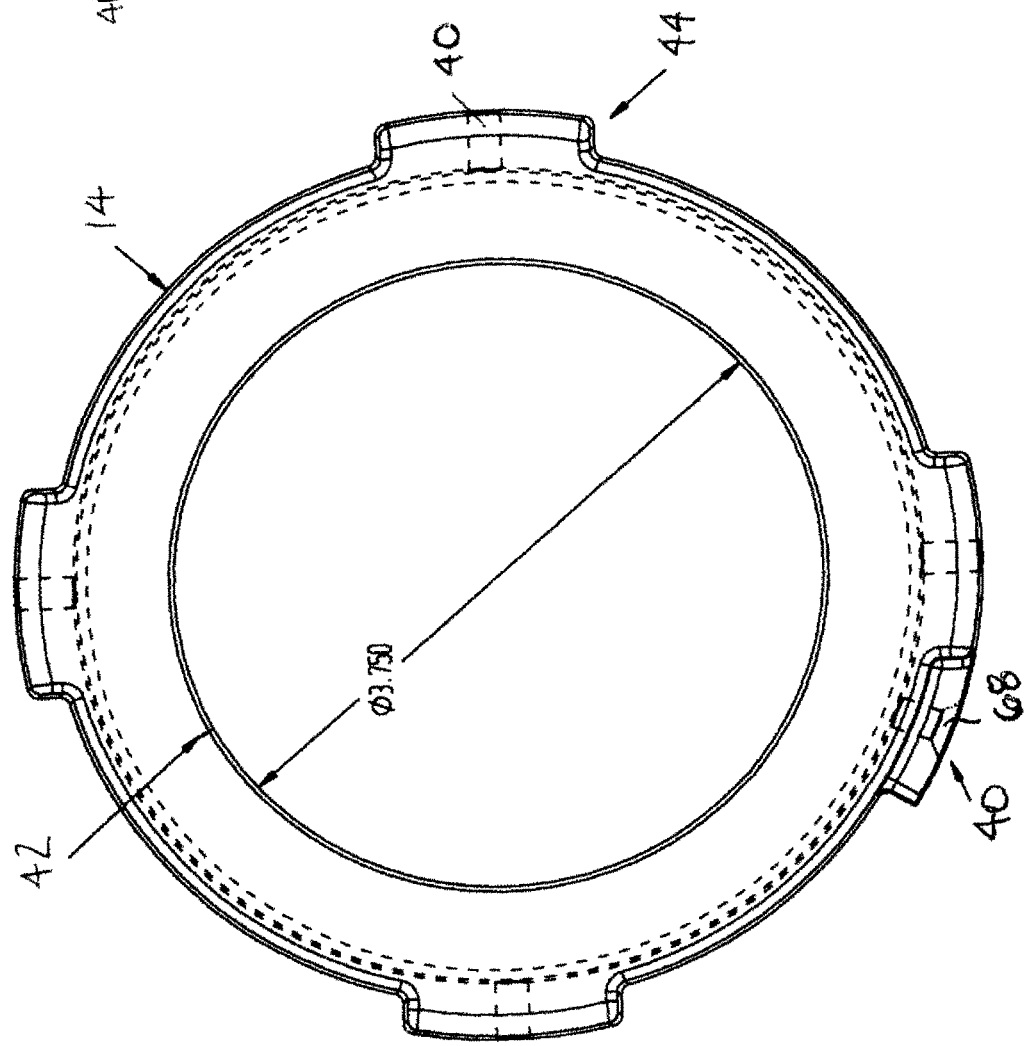

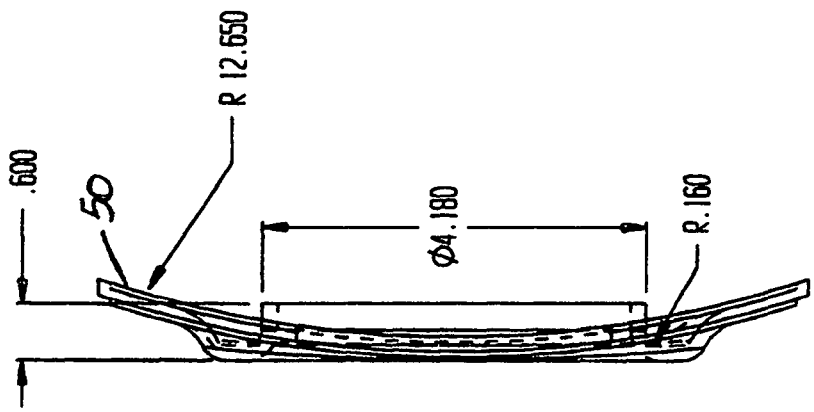
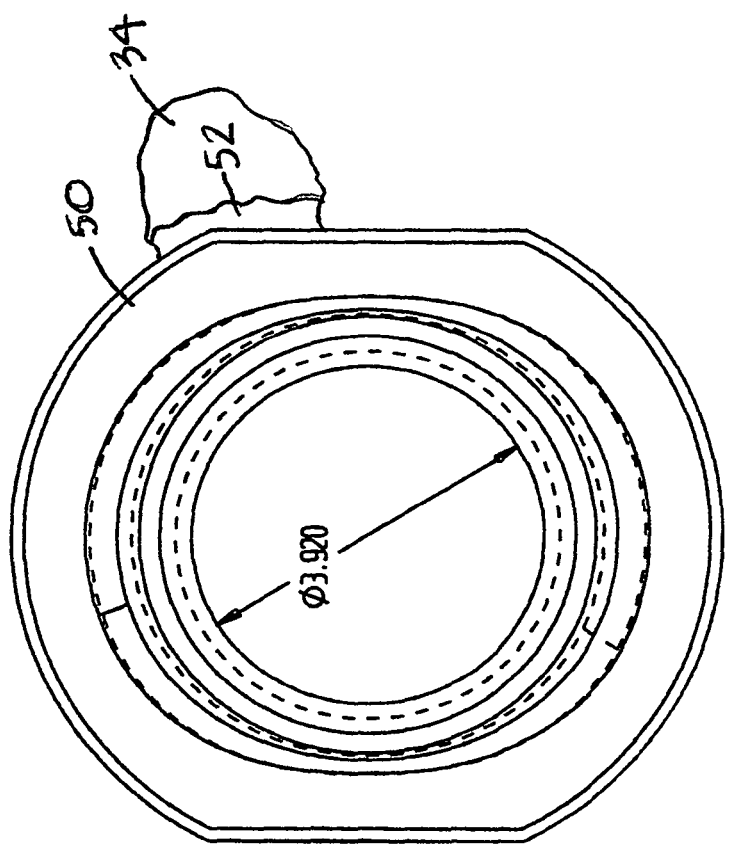

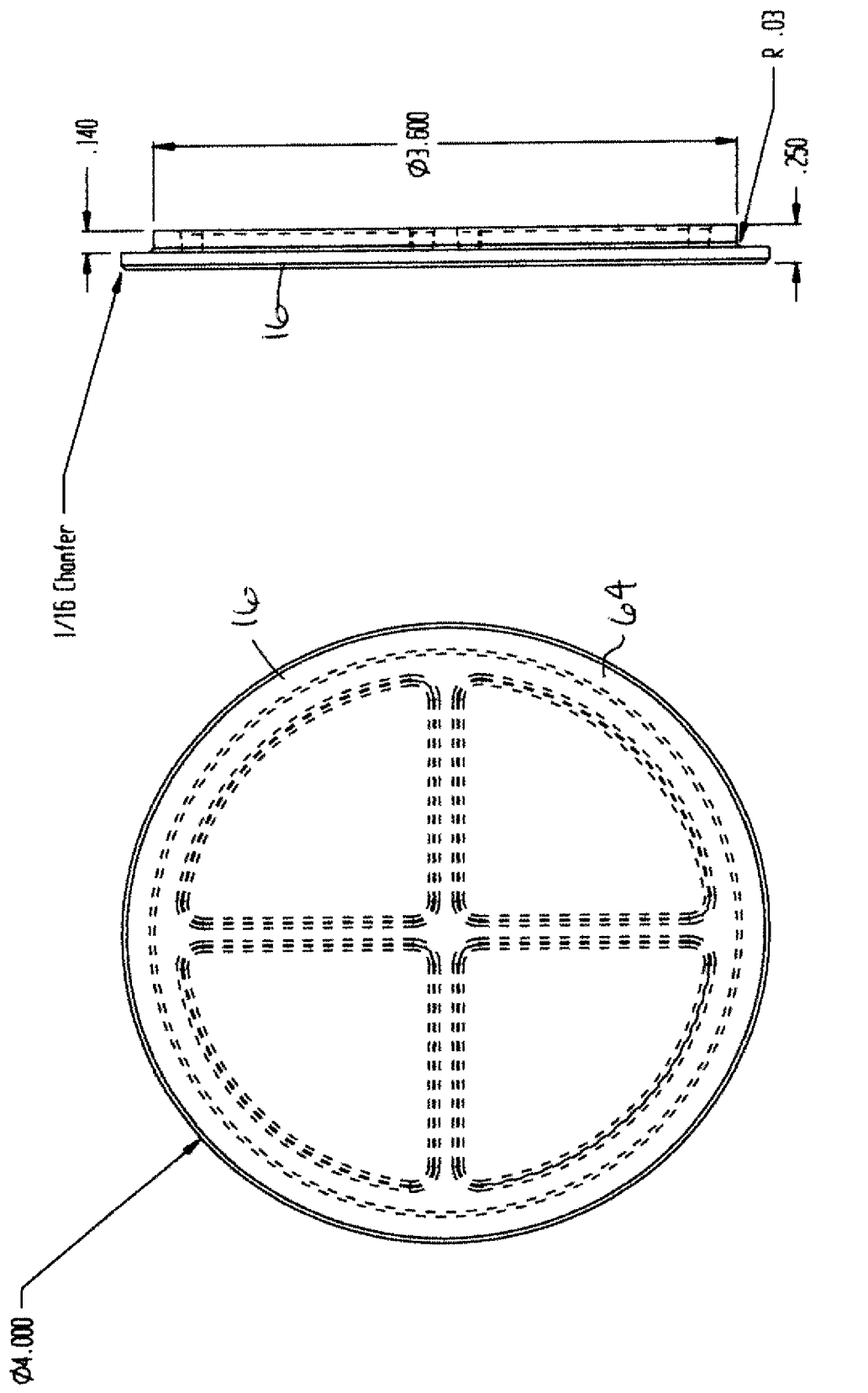

MULTI-USE FUEL TANK FLANGE ASSEMBLY

This application is a continuation-in-part (CIP) of U.S. patent application Ser. No. 14/059,042, filed on Oct. 21, 2013, which claims the benefit of U.S. provisional patent application Ser. No. 61/718,006, filed on Oct. 24, 2012, having inventors Ken Watson, Evan Waymire and John Loffink.

This application hereby incorporates by reference the entire content of U.S. patent application Ser. No. 14/059,042, filed on Oct. 21, 2013, and the entire content of U.S. provisional patent application Ser. No. 61/718,006, filed on Oct. 24, 2012, both applications having inventors Ken Watson, Evan Waymire and John Loffink.

1. TECHNICAL FIELD

The present invention relates to a multi-use fuel tank flange assembly, and a process of manufacturing the same, for use in commercial vehicles, and more particularly, to a multi-use fuel tank flange assembly that allows multiple components to be secured to the flange, such as a removable draw and return tube assembly, a fuel filler neck, and a cover plate, for example.

2. BACKGROUND OF THE INVENTION

The present invention is particularly intended for use on commercial vehicles, which may include multiple components secured to or in a fuel tank. Prior art fuel tanks typically include multiple components secured to or in the fuel tank, such as draw and return tube assemblies, fuel filler necks, pressure valves, or other components. Each of these components generally communicates with an interior of the fuel tank. Each component is generally secured directly to the fuel tank. If such a component fails, the component may be cut from the fuel tank, which may require a substantial amount of work to remove and then a substantial amount of work to repair the fuel tank and replace the repaired component.

SUMMARY OF THE INVENTION

The present invention provides a multi-use fuel tank flange assembly, and a process of manufacturing the same, that overcomes the disadvantages of the prior art. One aspect of the present invention provides a fuel tank flange that facilitates the attachment of multiple components thereto. Accordingly, a draw and return tube assembly, a fuel filler neck, and a cover plate, for example, may all be separately secured to the multi-use flange. Moreover, each of these components may be removed from the flange which may reduce repair costs if an individual component fails. Multiple flanges may be used on a single fuel tank to allow multiple components to be secured to the single fuel tank. Accordingly, the multi-use fuel tank flange assembly may allow a fuel tank to be manufactured at a lower cost than prior art devices and may also allow servicing or rearranging of the fuel tank components after installation thereof.

BRIEF DESCRIPTION OF THE DRAWINGS

FIG. 3 is a plan view of a lock ring of FIG. 1.

FIG. 4 is a side view of the lock ring of FIG. 3.

FIG. 7 is a top view of the flange plate of FIG. 1.

FIG. 8 is a side view of the flange plate of FIG. 7.

FIG. 11 is a top view of the cover plate of FIG. 1.

FIG. 12 is a side view of the top plate of FIG. 11.

DETAILED DESCRIPTION OF THE PREFERRED EMBODIMENTS

The invention discloses a multi-use fuel tank flange assembly that allows multiple components to be secured to, and there after removed from, a fuel tank with use of a single size flange.

Figure 1:
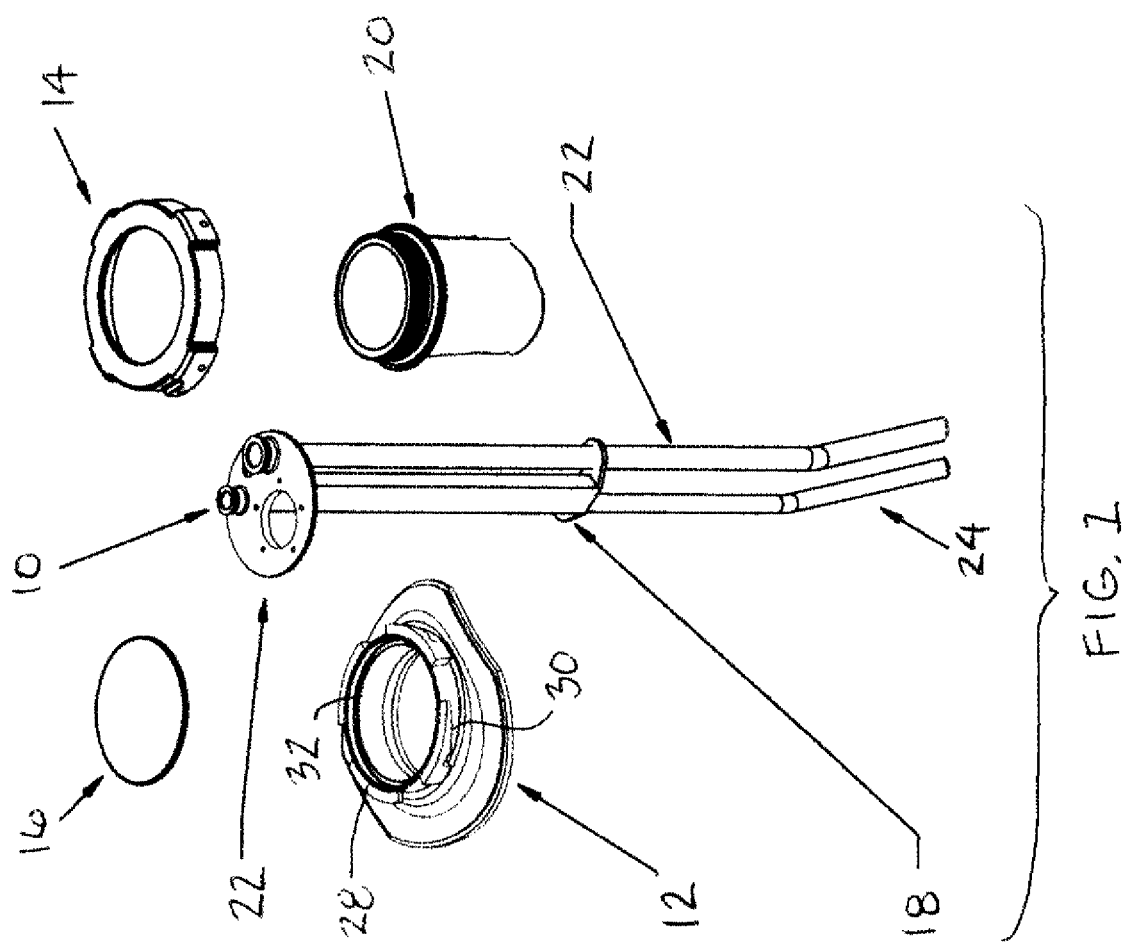
FIG. 1 is an exploded view of one example embodiment of the multi-use fuel tank flange assembly showing a flange, a lock ring, and three components that may be secured by the lock ring in the flange.

FIG. 1 is an exploded view of one example embodiment of the multi-use fuel tank flange assembly 10 showing a flange 12, a lock ring 14, and three components, such as a cover plate 16, a serviceable draw and return tube assembly 18, and a fuel filler neck 20, that may be secured by the lock ring 14 in the flange 12. Draw and return tube assembly 18 may include a top plate 22 with a first tube 24 and second tube 26 secured there to. Flange 12 may include a cam lock casting 28 having cam ramps 30 on an exterior there of for securement of cam ring 14 there on, and a seating surface 32 on an interior there of for supporting and securing there on components 16, 18 and 20, or other such components that have a plate or other such structure sized to be received on seating surface 32.

Figure 2:
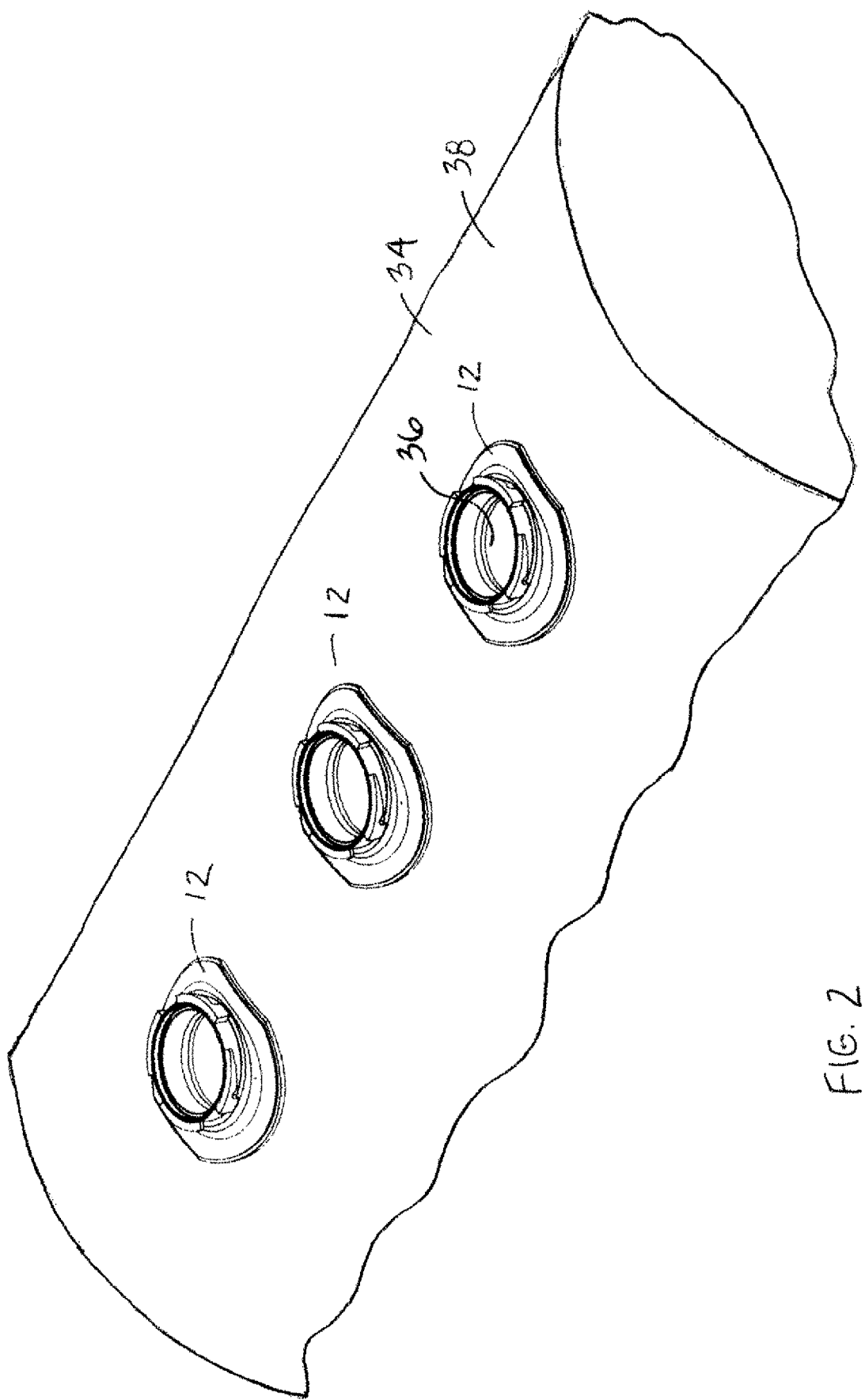
FIG. 2 is an isometric view of one example embodiment of a fuel tank having three flanges of FIG. 1 secured thereto.

FIG. 2 is an isometric view of one example embodiment of three flanges 12 of FIG. 1 secured to a fuel tank 34. Any number, position, or arrangement of flanges 12 may be secured on tank 34 as may be desired. In one embodiment, each flange 12 is welded around an aperture 36 in a wall 38 of fuel tank 34 such that flange 12 allows for communication between an exterior and an interior of fuel tank 34.

FIG. 3 is a plan view of a lock ring 14 of FIG. 1. Lock ring 14 includes pins 40 that engage a recess at an end of camp ramps 30 (FIG. 1) on cam lock casting 28 (FIG. 1) to secure lock ring 14 on cam lock casting 28. Lock ring 14 includes an aperture 42 that extends through the lock ring 14 such that ring 14 may secure a component on flange 12 while still allowing for access to the component secured there on. Lock ring 14 may also include outwardly extending grip regions 44 which may have pins 40 secured there in.

FIG. 4 is a side view of the lock ring 14 of FIG. 3.

Figure 5:
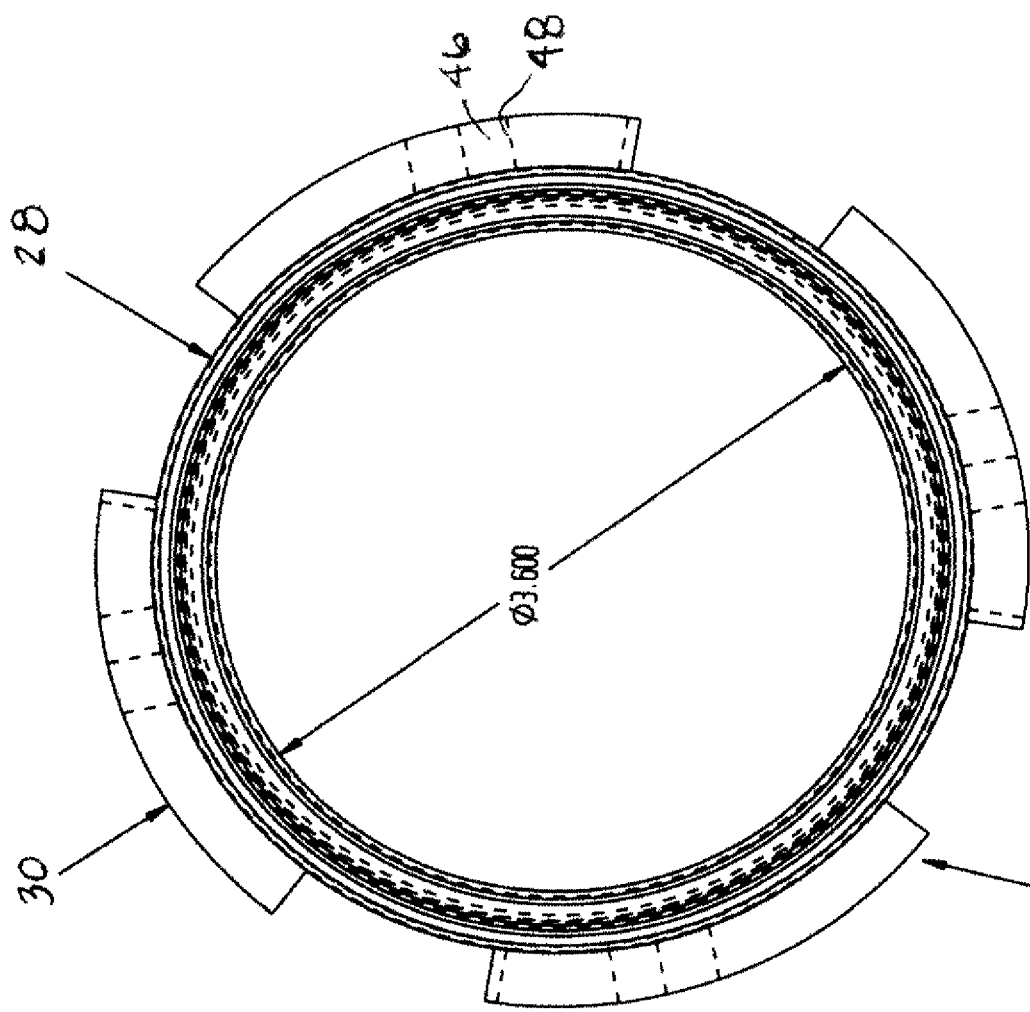
FIG. 5 is a top view of the cam lock casting of the flange of FIG. 1.

FIG. 5 is a top view of the cam lock casting 28 of the flange 12 of FIG. 1. Casting 28 includes multiple ramps 30 that include a recessed region 46 and a stop surface 48 at the end of each ramp 30 so as to secure individual ones of pins 40 (FIG. 3) there in.

Figure 6:
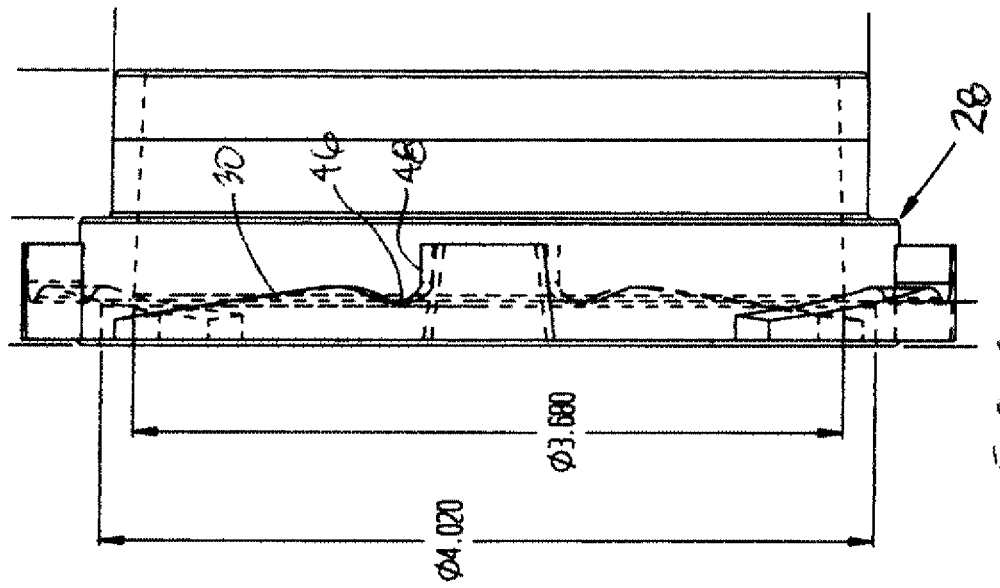
FIG. 6 is a side view of the cam lock casting of the flange of FIG. 5.

FIG. 6 is a side view of the cam lock casting 28 of the flange 12 of FIG. 5.

FIG. 7 is a top view of the flange plate 50 of flange 12 of FIG. 1. Flange plate 50 may be secured to a fuel tank 34 by any suitable method, and in one embodiment may be secured to a fuel tank by welding 52 (only a portion shown there of for ease of illustration). Cam lock casting 28 (FIG. 5) may be secured to flange plate 50 by welding or the like.

FIG. 8 is a side view of the flange plate 50 of FIG. 7.

Figure 9:
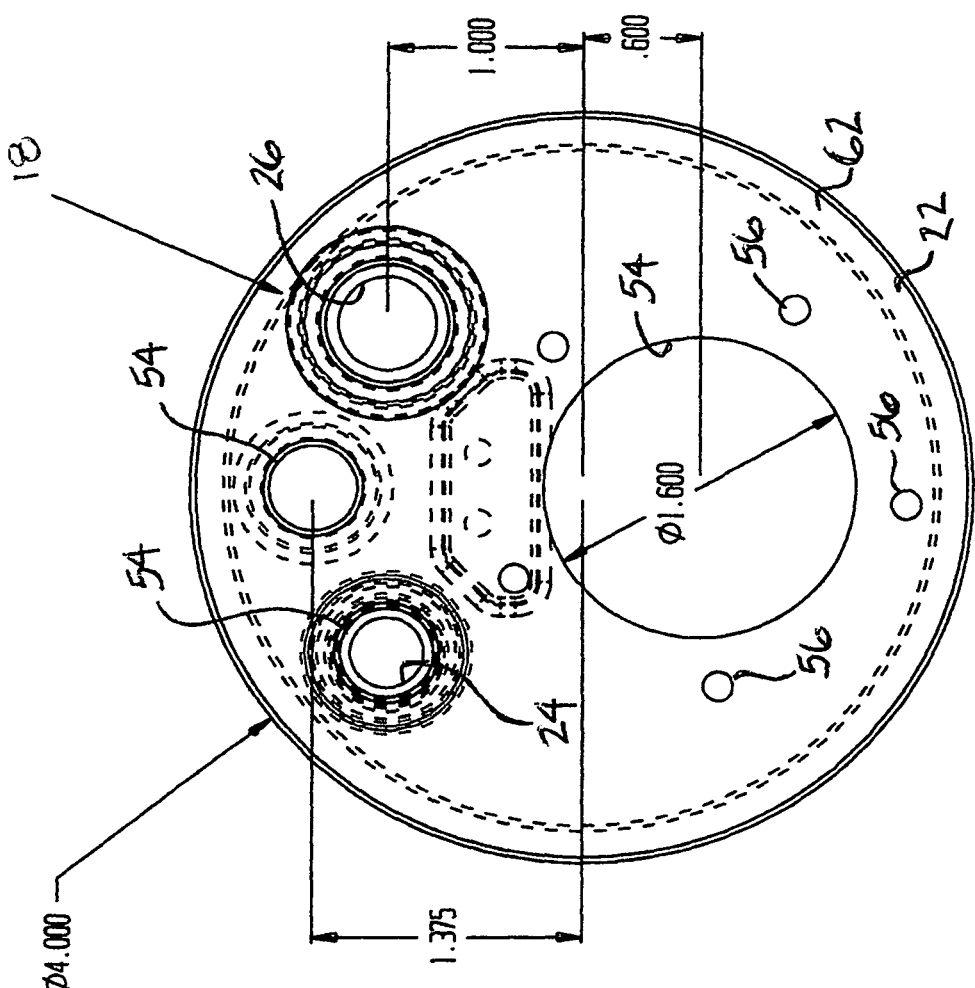
FIG. 9 is a top view of the draw and return tube assembly top plate of FIG. 1.

FIG. 9 is a top view of the draw and return tube assembly 18 top plate 22 of FIG. 1. Top plate 22 may include multiple apertures 54, in a variety of sizes and positions on top plate 22, for securing components there on or there in. In the embodiment shown, first and second tubes 24 and 26 are secured in two of apertures 54. Other apertures 54 may have secured there in a fuel sender unit, a thermal relief vent, or other components, for example. Top plate 22 may also include apertures 56 around a single aperture 54 such that fasteners may be received within aperture 56 so as to secure a component within an aperture 54.

Figure 10:
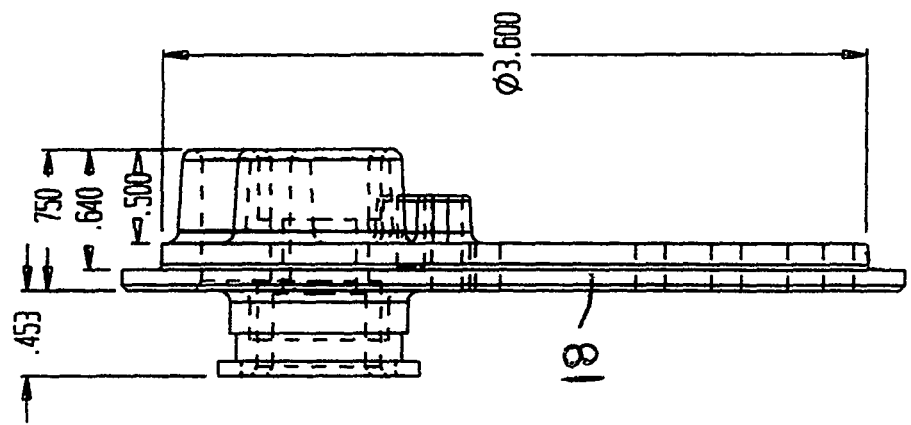
FIG. 10 is a side view of the draw and return tube assembly top plate of FIG. 9.

FIG. 10 is a side view of the draw and return tube assembly top plate 22 of FIG. 9.

FIG. 11 is a top view of the cover plate 16 of FIG. 1. Cover plate 16 may be placed within a flange 12 to cover and seal aperture 36 (FIG. 2) of flange 12 if no other component is secured therein. Cover plate 16 may be placed within flange 12 during servicing of a component that has recently been removed from flange 12.

FIG. 12 is a side view of the top plate 16 of FIG. 11.

Figure 13:
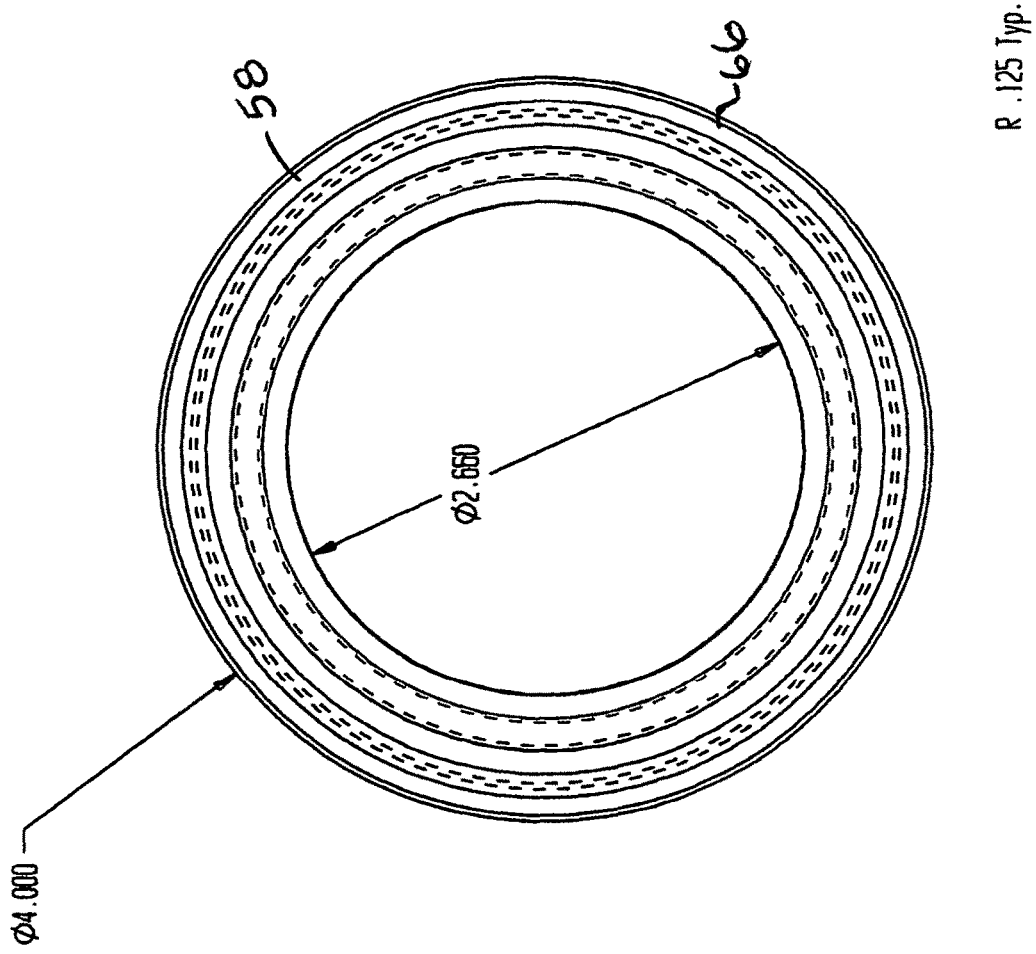
FIG. 13 is a top view of the fuel neck casting of FIG. 1.

FIG. 13 is a top view of the fuel neck casting 58 that may be placed on support surface 32 of flange 12 of FIG. 1.

Figure 14:
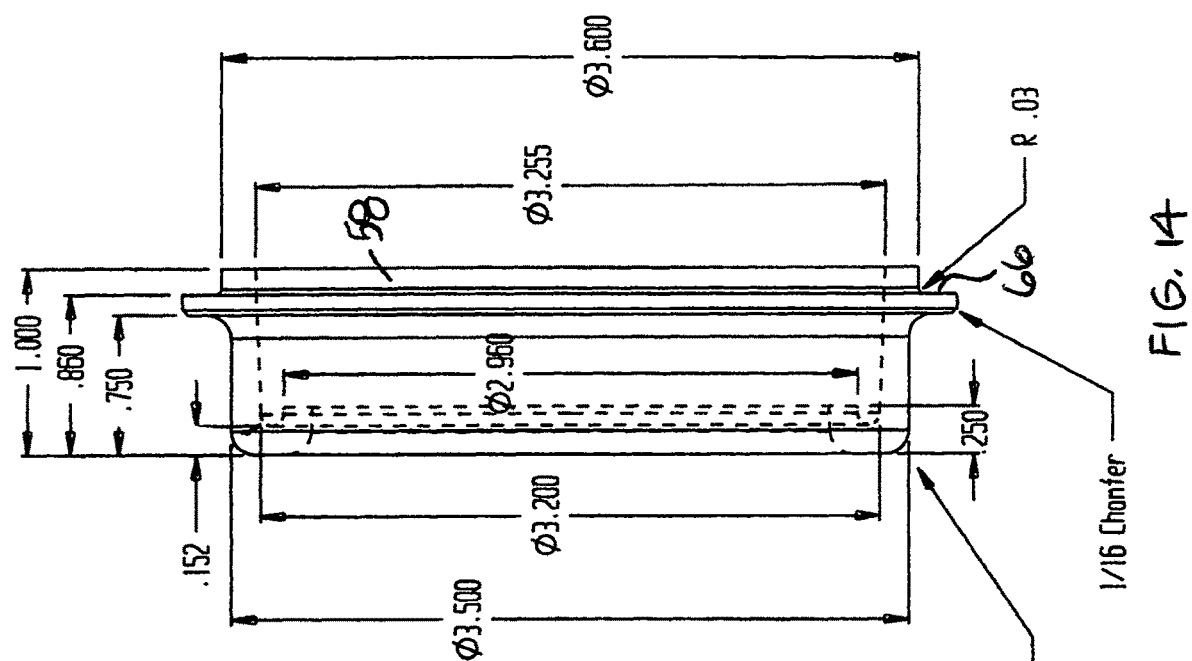
FIG. 14 is a side view of the fuel neck casting of FIG. 13.

FIG. 14 is a side view of a fuel neck casting 58 of FIG. 13.

Figure 15:
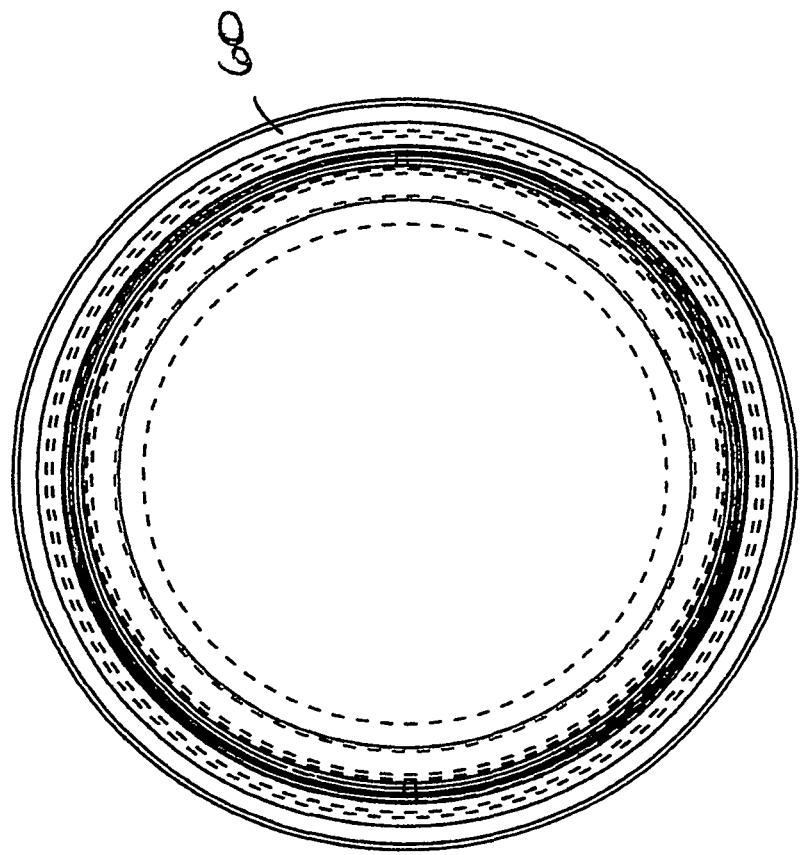
FIG. 15 is a top view of the threaded fill neck of FIG. 1.

FIG. 15 is a top view of a threaded fill neck 60 that may be threaded into a lower side of the fuel neck casting 58 of FIG. 13. A fuel filler neck tube extension may be secured to threaded fill neck 60 to provide an elongate fuel filler neck assembly.

Figure 16:
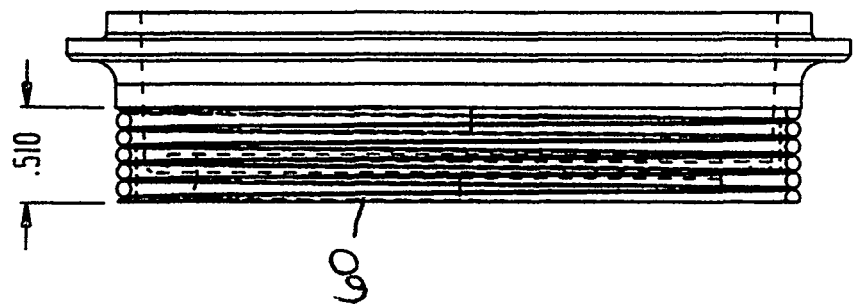
FIG. 16 is a side view of the threaded fill neck of FIG. 15.

FIG. 16 is a side view of the threaded fill neck 60 of FIG. 15.

The method of securing the assembly 10 on a fuel tank will now be described. Flange plate 50 may be secured on a fuel tank 34 by welding, or any suitable method. In the embodiment shown all components, except O-rings, seals and the like, are manufactured of aluminum. Other materials, such as steel or plastic may be utilized. Cam lock casting 28 is secured to flange plate 50 before or after flange plate 50 is secured to fuel tank 34. A component is placed within flange 12 such that a surface of the component is seated on seating surface 32 of flange 12. In the case of draw and return assembly 18, an outer edge 62 (FIG. 9) of top plate 22 is seated on seating surface 32 of flange 12. In the case of cover plate 16, an outer edge 64 (FIG. 11) of cover plate 16 is seated on seating surface 32 of flange 12. In the case of fuel filler neck 20, an outer edge 66 (FIG. 13) of fuel neck casting 58 is seated on seating surface 32 of flange 12. After a component is positioned in flange 12 and seated on seating surface 32, lock ring 14 is tightened on cam lock casting 28 to secure the component on flange 12 and to define an air tight and fluid tight seal there around. A fastener, such as a set screw 68 (FIG. 3) may then be secured within lock ring 14 to secure lock ring 14 on cam lock casting 28 of flange plate 50.

If a component fails, or if a component is to be replaced with another component, set screw 68 may be loosened and removed from lock ring 14. The lock ring 14 may then be removed from cam lock casting 28, and the component lifted from flange 12. A new component may then be placed within flange 12 and the securement process repeated to secure the new or repaired component there on. In this manner, components may be repaired or replaced on a fuel tank without requiring damage to the component or to the fuel tank during removal of the component. The arrangement and number of components extending downwardly into the fuel tank may be changed in a quick, easy, and cost effective manner.

As may be understood from the above description and drawings, the present invention has many advantages over prior art fuel tank assemblies.

In the above description numerous details have been set forth in order to provide a more through understanding of the present invention. It will be obvious, however, to one skilled in the art that the present invention may be practiced using other equivalent designs.

I claim:

1. A fuel tank, comprising:
    a fuel tank including a side wall having an aperture extending there through;
    a flange secured on said fuel tank at said aperture and forming an airtight seal between said flange and said side wall around said aperture;
    a plate releasably secured on said flange, said plate including a plurality of fuel flow components secured to said plate and extending into said aperture of said fuel tank; and
    a lock ring that includes a first locking structure that mates with a second locking structure of said flange, said lock ring defining a top expanse including a central aperture through which said plurality of fuel flow components extend when said plate is secured to said flange by said lock ring, said lock ring including a side wall extending perpendicular from said top expanse, said side wall extending continuously around a perimeter of said top expanse to define a solid side wall of said lock ring and to define an interior surface of said lock ring side wall, wherein an interior surface of said top expanse and said interior surface of said lock ring side wall define an interior of said lock ring, and wherein said first locking structure of said lock ring is positioned on said interior surface of said solid lock ring side wall and extends radially inwardly from said solid lock ring side wall into said interior of said lock ring;
    wherein said second locking structure of said flange comprises a plurality of cam ramps and wherein said first locking structure of said lock ring comprises a plurality of pins that each move along a corresponding one of said cam ramps to releasably secure said lock ring on said flange, said pins each extending perpendicular to and through said solid side wall and into said interior of said lock ring.

2. The fuel tank of claim 1 wherein said plurality of fuel flow components are chosen from the group consisting of a fuel draw tube, a fuel return tube, a fuel sender unit, an auxiliary fuel draw tube, and a vent device.

3. The fuel tank of claim 1 wherein at least one of said plurality of fuel flow components is releasably secured to said plate with a barbed fitting.

4. The fuel tank of claim 1 wherein said fuel tank and said flange are manufactured of metal and at least one of said plurality of said fuel flow components is manufactured of plastic, said plastic component releasably secured to said plate with a snap fitting.

5. The fuel tank of claim 1 wherein said flange includes a seating surface, said plate includes an outer edge region that seats on said seating surface of said flange, said lock ring captures said outer edge region of said plate to secure said plate between said lock ring and said flange seating surface.

6. The fuel tank of claim 1 wherein said plurality of cam ramps of said second locking structure each comprise a cam ramp that terminates in a stop surface positioned upwardly from an adjacent portion of said cam ramp such that said stop surface is positioned closer to said top expanse than said adjacent portion of said cam ramp, said cam ramps positioned on an exterior surface of said flange.

7. The fuel tank of claim 6 wherein said first locking structure of said lock ring comprises a plurality of pins that extend inwardly from said interior surface of said lock ring, wherein each pin moves along a corresponding one of said cam ramps and into engagement with a corresponding one of said stop surfaces to releasably secure said lock ring on said flange.

8. The fuel tank of claim 7 wherein said lock ring further includes a set screw that extends into engagement with said flange and releasably secures said lock ring on said flange.

9. The fuel tank of claim 1 wherein said cam ramps are positioned on an exterior surface of said flange, wherein said interior surface of said lock ring completely surrounds and encloses said exterior surface and said cam ramps of said flange, wherein said lock ring includes outwardly extending grip regions, and wherein said plurality of pins are secured within and extend inwardly from corresponding ones of said grip regions.

10. A method of installing a draw and return tube assembly, comprising:
 providing a fuel tank including a side wall having an aperture extending there through;
 securing a flange on said fuel tank at said aperture;
 positioning a plate on said flange, said plate including a plurality of fuel flow components that extend into said aperture of said fuel tank; and
 releasably securing a collar to said flange, said collar including a first locking structure positioned on an inwardly facing surface of said collar, said first locking structure releasably mating with a second locking structure on said flange to releasably secure said plate between said collar and said flange, wherein said collar defines a top surface including a single, central aperture through which said plurality of fuel flow components extend when said plate is secured to said flange by said collar, said collar including a side wall extending perpendicular to said top surface, said side wall extending continuously around an edge of said top surface to define a solid side wall of said collar and to define said inwardly facing surface of said collar, wherein said first locking structure of said collar is positioned on said inwardly facing surface of said solid side wall of said collar and extends radially inwardly from said solid side wall into an interior of said collar;
 wherein said second locking structure of said flange comprises a plurality of cam ramps and wherein said first locking structure of said collar comprises a plurality of cylindrical members that each move along a corresponding one of said cam ramps to releasably secure said collar on said flange and to secure said plate between said flange and said collar, said cylindrical members each extending perpendicular to and through said solid side wall and into said interior of said collar.

11. The method of claim 10 wherein at least one of said plurality of said fuel flow components is manufactured of plastic by the process of extrusion.

12. The method of claim 10 further comprising removing said plate from securement on said flange so as to access one of said plurality of said fuel flow components.

13. A serviceable draw and return tube assembly, comprising:
 a flange adapted for securement on a fuel tank, said flange including a seating surface positioned around a central aperture of said flange, said flange including first securement structure positioned around said central aperture;
 a plate including first and second fuel flow component apertures extending there through, said plate including an outer edge region received on said seating surface of said flange;
 a first fuel flow component releasably secured on said flange within said first fuel flow component aperture;
 a second fuel flow component releasably secured on said flange within said second fuel flow component aperture; and
 a lock ring including second securement structure that mates with said flange first securement structure for securing said lock ring on said flange and securing said plate between said flange and said lock ring, said second securement structure positioned on a continuous interior surface of a continuous side wall of said lock ring that extends completely around a perimeter of said lock ring such that said second securement structure extends inwardly toward said first securement structure of said flange and such that said continuous side wall of said lock ring conceals said first securement structure of said flange from view when said lock ring is secured thereon;
 wherein said first securement structure of said flange comprises a system of cam ramps and wherein said second securement structure of said lock ring comprises a system of cylindrical members that mate with corresponding ones of said cam ramps to secure said lock ring on said flange, said cylindrical members extending inwardly from said continuous interior surface of said lock ring.

14. The assembly of claim 13 wherein said plate further includes third and fourth fuel flow component apertures, said assembly further comprising a third fuel flow component releasably secured on said third fuel flow component aperture, and a fourth fuel flow component releasably secured on said fourth fuel flow component aperture.

15. The assembly of claim 13 wherein said lock ring includes a central aperture, and wherein said first and second first fuel flow components are positioned within a central region of said plate and are positioned within said central aperture of said lock ring when said plate is secured on said flange by said lock ring.

16. The assembly of claim 13 wherein said first and second fuel flow components are each chosen from a group consisting of a fuel sender unit, a vent device, a fuel draw tube, and a fuel return tube.

* * * * *